(12) United States Patent
Bodorlo

(10) Patent No.: US 11,543,784 B2
(45) Date of Patent: Jan. 3, 2023

(54) TIME COMPONENT ADJUSTMENT DEVICE

(71) Applicant: Tivadar Bodorlo, Delray Beach, FL (US)

(72) Inventor: Tivadar Bodorlo, Delray Beach, FL (US)

( * ) Notice: Subject to any disclaimer, the term of this patent is extended or adjusted under 35 U.S.C. 154(b) by 0 days.

(21) Appl. No.: 17/220,199

(22) Filed: Apr. 1, 2021

(65) Prior Publication Data

US 2022/0317633 A1 Oct. 6, 2022

(51) Int. Cl.
*G04R 20/26* (2013.01)
*G06F 1/14* (2006.01)
*G04G 7/00* (2006.01)

(52) U.S. Cl.
CPC .............. *G04R 20/26* (2013.01); *G04G 7/02* (2013.01); *G06F 1/14* (2013.01)

(58) Field of Classification Search
CPC .......... G04R 20/06; G04R 20/26; G04G 7/02
See application file for complete search history.

(56) References Cited

U.S. PATENT DOCUMENTS

| | | | | |
|---|---|---|---|---|
| 8,873,342 B1 * | 10/2014 | Boudreaux | ............... | G04G 9/04 368/47 |
| 8,891,338 B2 * | 11/2014 | Johnson | ................. | G04C 11/04 368/47 |
| 9,798,292 B2 * | 10/2017 | Meusburger | ...... | H04W 56/0015 |
| 2015/0198928 A1 * | 7/2015 | Hasegawa | ............... | G04R 20/04 368/10 |
| 2017/0220137 A1 * | 8/2017 | Han | ........................ | G04G 21/00 |
| 2017/0230236 A1 * | 8/2017 | Kim | .......................... | H04N 5/04 |
| 2018/0017946 A1 * | 1/2018 | Kyou | ...................... | H04W 4/80 |
| 2018/0245921 A1 * | 8/2018 | Hanada | ................. | H04W 4/025 |
| 2018/0267484 A1 * | 9/2018 | Morohoshi | ............ | G04R 20/26 |
| 2020/0280923 A1 * | 9/2020 | Matsuoh | ................. | G04G 21/02 |
| 2021/0157279 A1 * | 5/2021 | Nakamura | ............. | G04R 40/06 |
| 2021/0211461 A1 * | 7/2021 | Beardsley | ............. | H04L 7/0008 |

* cited by examiner

*Primary Examiner* — Edwin A. Leon
*Assistant Examiner* — Jason M Collins
(74) *Attorney, Agent, or Firm* — The Concept Law Group, PA; Scott D. Smiley; Scott M. Garrett

(57) ABSTRACT

A system, method, and apparatus to automatically detect clocks within a given space and synchronize each clock within the given space to display the correct time is provided. The system includes a time component adjusting device including a communication module configured to detect and connect to clocks within the vicinity of the time component adjusting device, generate a clock tracking profile for each of the clocks, and ensure that each of the clocks depict the accurate time. The time component adjusting device also seeks to prevent desynchronization of clocks upon occurrence of events such as daylight savings and leap seconds.

20 Claims, 7 Drawing Sheets

TIME COMPONENT ADJUSTMENT DEVICE

FIELD OF THE INVENTION

The present invention relates generally to the field of wireless communications, and, more particularly, relates to systems and methods for adjusting time components of devices using wireless communications.

BACKGROUND OF THE INVENTION

For centuries, clocks have served as mechanisms for indicating the current time at a given location. However, a previous issue was that a significant amount of clocks did not include a processor or applicable module configured to access a wireless network; therefore they lacked the ability to display the correct time in an automated manner. In other words, because the clocks were only configured to be adjusted manually, the clocks inevitably depicted an incorrect time due to anticipated events, such as daylight savings time.

Solutions to this issue have been provided, but integrating this functionality into certain categories of clocks is impractical. Furthermore, the number of devices that digitally indicate the current time is larger than ever, resulting in a greater number of devices such as, but not limited to, appliances, vehicles, and other frequently interacted with devices depicting the incorrect time at least once a year. A common approach is for an individual to manually adjust each individual clock whenever necessary; however, this is an arduous task in environments that either have multiple clocks and/or have clocks positioned in areas that are difficult to reach. For example, wall clocks positioned in rooms with high ceilings require a ladder in order to reach the clock and manually set it to the correct time. Also, depending on the habitat, an environment such as a kitchen may include a wall clock, a microwave clock, an oven clock, a coffee maker clock, and a plurality of other applicable clocks that all require adjustment; thus, the individual is tasked with manually adjusting multiple clocks within a single room. Thus, the desire for all clocks to be synchronized within a given space proves to be a difficult task due to the fact that, if a respective clock does not include the ability to self-adapt, then an individual is manually required to adjust the clock regardless of location and/or configuration.

Therefore, a need exists to overcome the problems with the prior art as discussed above. In particular, what is needed is a system, device, and method to automatically detect clocks within a given space and synchronize each clock within the given space to display the correct time.

SUMMARY OF THE INVENTION

The invention provides a system and method for time component adjustment that overcomes the hereinafore-mentioned disadvantages of the heretofore-known devices and methods of this general type and that effectively prevents not only incorrect depiction of the time on clocks, but also the requirement for individuals to manually adjust clocks.

With the foregoing and other objects in view, there is provided, in accordance with the invention, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A system of one or more computers can be configured to perform particular operations or actions by virtue of having software, firmware, hardware, or a combination of them installed on the system that, in operation, causes the system to perform the actions. One or more computer programs can be configured to perform particular operations or actions by virtue of including instructions that, when executed by a data processing apparatus, cause the apparatus to perform the actions. One general aspect includes a time component adjusting device including a power source; a memory; a communications module communicatively coupled to the power source; and a processor communicatively coupled to the power source, where the processor is designed and configured to: broadcast a first signal to a plurality of clocks, where the plurality of clocks are configured to establish a connection with the communications module; receive a second signal from at least one clock of the plurality of clocks including a time component; generate a clock tracking profile for the at least one clock of the plurality of clocks; store the clock tracking profile in the memory; detect accuracy of the time component based on an active timekeeping module associated with the communications module; and update the clock tracking profile based on detection of an inaccuracy of the time component. In one embodiment, a housing configured to retain the power source, the memory, the processor, and the communications module is provided.

In one embodiment, the processor is configured to automatically apply a daylight savings adjustment and/or a leap seconds adjustment to the time component based on the processor detecting one or more inaccuracies of the time component associated with the plurality of clocks.

In one embodiment, a method of time component adjusting is presented. The method includes broadcasting, via a time component adjusting device including a processor, a first signal to a plurality of clocks, wherein the plurality of clocks are configured to establish a connection with a communications module; receiving, via the communications module, a second signal from at least one clock of the plurality of clocks including a time component; generating, via the processor, a clock tracking profile for each clock of the plurality of clocks; storing, via the processor, the clock tracking profiles in a memory; detecting, via the processor, accuracy of the time component based on an active timekeeping module associated with the communications module; and updating, via the processor, the clock tracking profiles based on detection of an inaccuracy of the time component. Other embodiments of this aspect include corresponding computer systems, apparatus, and computer programs recorded on one or more computer storage devices, each configured to perform the actions of the methods.

Although the invention is illustrated and described herein as embodied in a system, apparatus, and methods for time component adjustment, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
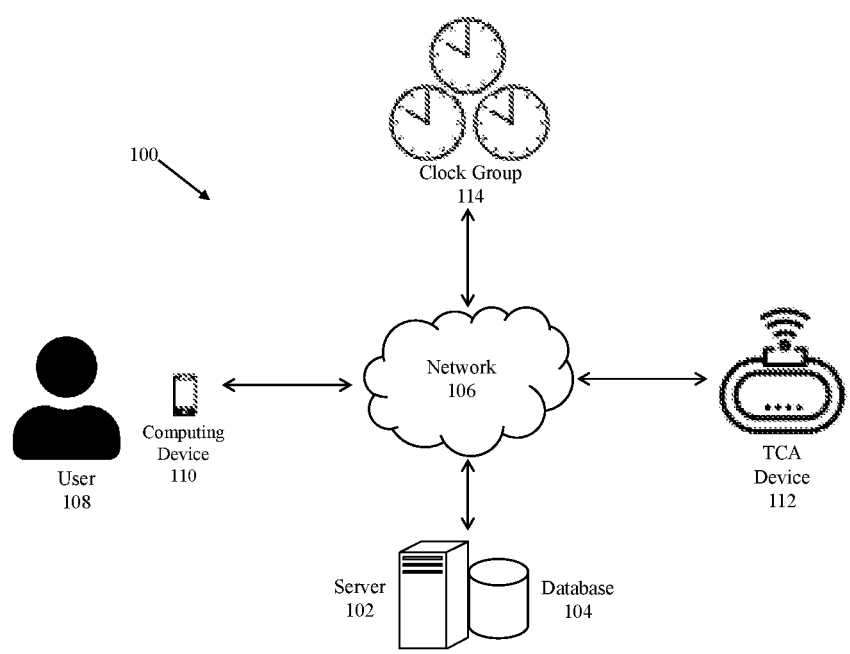
FIG. 1 is a block diagram depicting an exemplary system for time component adjustment, according to an example embodiment.
Figure 2A:
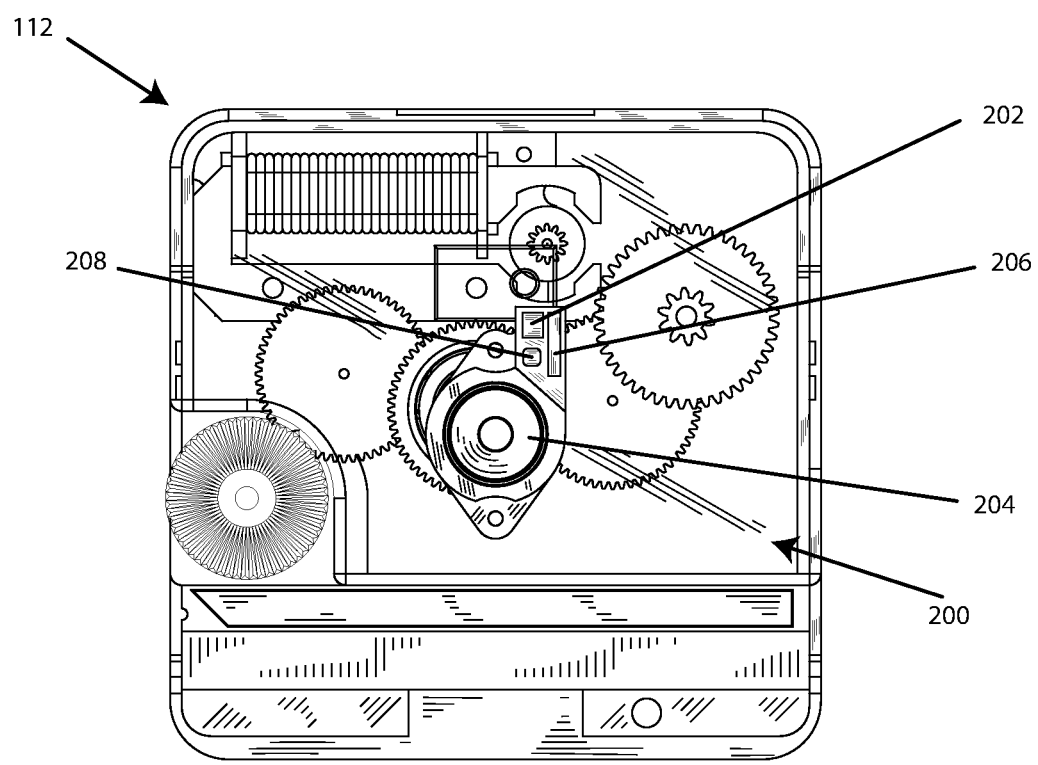
FIG. 2A is a front view of a time component adjustment device, according to an example embodiment.
Figure 2B:
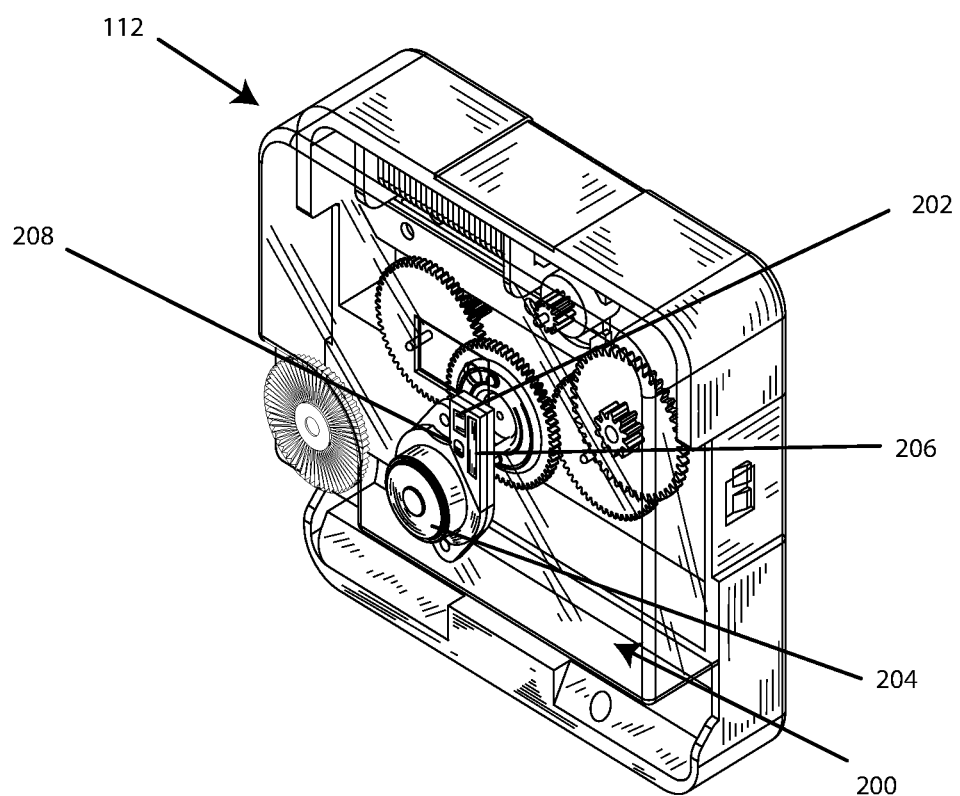
FIG. 2B is a perspective view of the time component adjustment device of FIG. 2A, according to an example embodiment.
Figure 2C:
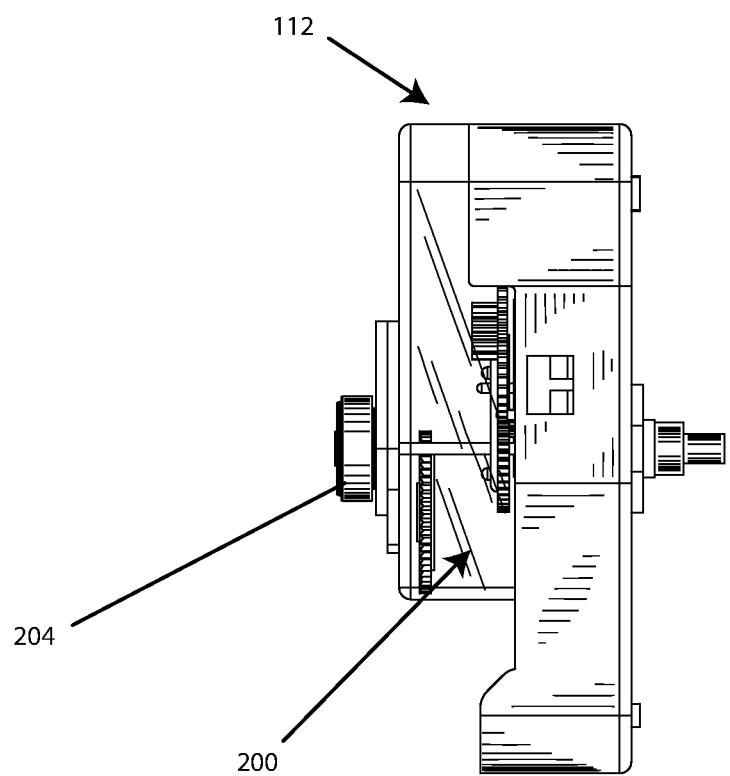
FIG. 2C is a side view of the time component adjustment device of FIG. 2A, according to an example embodiment.
Figure 2D:
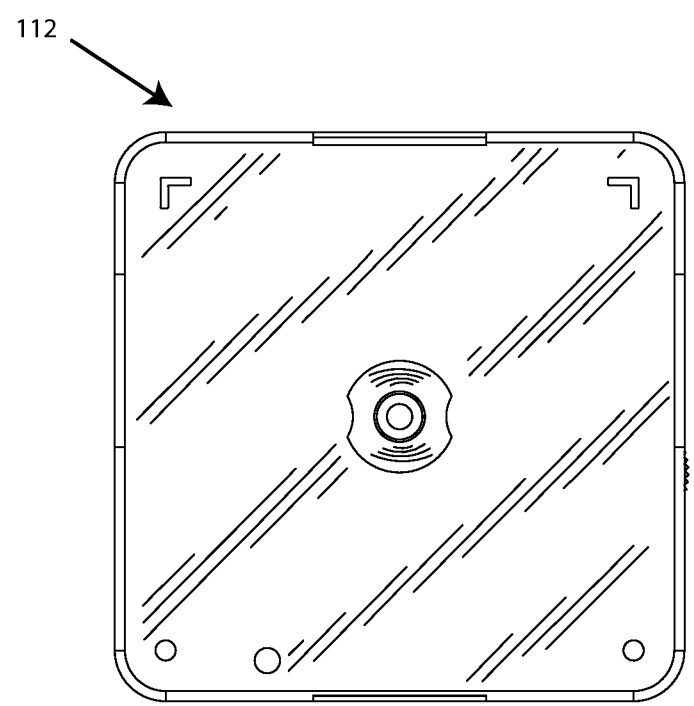
FIG. 2D is a back view of the time component adjustment device of FIG. 2A, according to an example embodiment.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system of time component adjustment configured to detect clocks within an environment and synchronize all detected clocks resulting in the clocks depicting the correct time. Embodiments of the invention provide a time component adjustment device including a communications module configured to transmit one or more signals in order to detect a plurality of clocks within the environment. In addition, embodiments of the invention provide a mobile application operating on a computing device configured to allow a user to view data associated with the time component adjustment device and the plurality of clocks having an established connection with the communications module. Embodiments of the invention provide a server, communicatively coupled to the time component adjustment device and the computing device, configured to provide the mobile application in addition to generate clock tracking profiles including time components for each clock of the plurality of clocks, and update the time components based on an inaccuracy detected by the server. Embodiments of the invention further provide a daylight savings function configured to automatically adjust the time component of each clock tracking profile to accurately reflect the daylight savings time adjustment. The systems and methods described herein are configured to maintain synchronization of clocks in addition to confirming accuracy of time components presented via clocks.

Referring now to FIG. 1, a system for time component adjustment 100 is depicted according to an exemplary embodiment. In one embodiment, system 100 includes a server 102, a database 104, a communications network 106, a user 108, a computing device 110 associated with user 108, a time component adjustment (TCA) device 112, and a plurality of clocks (clock group) 114. It is to be understood that server 102 is communicatively coupled to computing device 110 and TCA device 112 over network 106; wherein network 106 may be a wireless local area network (WLAN), wireless personal area network (WPAN), wireless wide area network (WWAN), universal mobile telecommunications service (UMTS), enhanced packet system (EPS), new radio wireless network (NR), internet, LTE, GSM, WCDMA, $3^{rd}$ generation partnership project (3GPP), a combination of more than one network and/or more than one type of network, or any other applicable communications network known to those of ordinary skill in the art. System 100 is a computer-based system and the various components of system 100 are implemented at least partially by hardware at one or more computing devices, such as one or more hardware processors executing instructions stored in one or more memories for performing various functions described herein. For example, descriptions of various components (or modules) as described in this application may be interpreted by one of skill in the art as providing pseudocode, an informal high-level description of one or more computer structures. System 100 illustrates one of many possible arrangements of components configured to perform the functionality described herein. FIG. 1 shows several advantageous features of the present invention, but, as will be described below, the invention can be provided in several shapes, sizes, combinations of features and components, and varying numbers and functions of the components. Other arrangements may include fewer or different components, and the division of work between the components may vary depending on the arrangement. Computing device 110 may be a mobile phone, tablet, smart phone, desktop, laptop, wearable technology, or any other applicable device or system including at least a processor. Clocks included in clock group 114 may include, but is not limited to wall clocks, digital clocks, atomic clocks, radio clocks, battery clocks, or any applicable appliances and/or devices including a time component function. As described herein, time component is the depiction of the time as reckoned in a particular region or time zone; wherein the particular region or time zone is determined by at least one of server 102, user 108, and/or TCA device 112. It is to be understood that TCA device 112 is configured to establish one or more connections with plurality of clocks 114; wherein plurality of clocks 114 are configured to include one or more time components such as but not limited to radio signal transmitters/receivers, digital codes, resonance frequencies of atoms, GPS signals, or any other applicable means of representing time. In some embodiments, TCA device 112 may be an internet of things (IOT) device designed to support architecture and software that can enable enterprise IOT implementations and detect other IOT devices, wherein the applicable time depiction component of the applicable IOT device may automatically be adjusted by TCA device 112.

In some embodiments, TCA device 112 is configured to group a plurality of clocks 114 based on each clock being detected in an environment within a predefined proximity threshold from TCA device 112. For example, TCA device 112 may emit one or more signals configured to detect one or more clocks in an environment such as a household, wherein each clock within the household is detected and server 102 groups each detected clock into clock group 114 which is associated with the household. In some embodiments, upon detection of each clock within clock group 114, TCA device 112 provides one or more executable instructions for server 102 to generate a clock tracking profile for each clock of clock group 114. It is to be understood that the clock tracking profiles are clock-specific records including the time component of the respective clock configured to be stored in database 104, wherein TCA device 112 may automatically update the time component of the respective clock based on detection of an inaccuracy associated with the time component (wrong time compared to the time component associated with server 102 and/or TCA device 112). In some embodiment, the clock tracking profile may include a clock-specific timelog configured to depict the history and/or evolution of the respective time component. This feature allows either user 108 or server 102 to perform both micro-analytics and analytics associated with the applicable clock within clock group 114. For example, server 102 may determine based off of the clock tracking profile that a particular clock within clock group 114 automatically applies its own daylight savings adjustment indicating that TCA device 112 does not need to apply an update to the clock tracking profile due to the lack of inaccuracy of the time component.

Referring now to FIG. 2A-D, TCA device 112 is depicted, according to an exemplary embodiment. In some embodiments, TCA device 112 includes a housing 200 designed and configured to retain a processor 202, a power source 204, a memory 206, and a communications module 208; wherein processor 202 and communication module 208 are configured to be communicatively coupled to server 102 and computing device 110 over network 106. In some embodiments, housing 200 is configured to be composed of carbon steel, stainless steel, aluminum, titanium, composites, ceramics, polymeric materials such as polycarbonates, such as acrylonitrile butadiene styrene (ABS plastic), Lexan™, Makrolon™, or any other applicable material. In some embodiments, power source 204 is a brushless micro motor configured to include one or more rotors configured to generate rotational energy. Power source 204 may further include a plurality of switches, a micro motor specific power source (battery), or any other applicable component configured to efficiently provide power to TCA device 112. Memory 206 is configured to be a storage mechanism for either data associated with TCA device 112 or data associated with clock group 114 received by TCA device 112. It is to be understood that the purpose of memory 206 is to locally store data maintained by TCA device 112 and/or received by TCA device 112; however, data stored on memory 206 may be transmitted to server 102 by processor 202 over network 106 and subsequently stored in database 104.

In some embodiments, communication module 208 utilizes standard communication protocols to communicate with network 106. Some examples include WIFI (WLAN), Bluetooth (BLE), Zigbee, long range radio frequency (LoRa) technology, LTE, 3G, 2.4 GHZ & 5.0 GHz, Mesh, BLE Mesh, LoRaWAN, GPS, or any other applicable wireless technology known to those of ordinary skill in the art.

It is to be understood that communication module 208 is designed and configured to send and receive data over proprietary networks, shared networks, and open network architectures alike. In some embodiments, communication module 208 possesses the functionality to function as server 102 allowing TCA device 112 to communicate directly with computing device 110 over network 106. However, it is to be understood that the primary purpose of server 102 is to not only generate a centralized platform serving as a mobile application operating on computing device 110, but also simultaneously function as a communications server, web server, database server, application server, file server, proxy server, and the like.

In some embodiments, communication module 208 utilizes at least one of a WIFI module or Bluetooth energy module, or in some embodiments Bluetooth low energy module, to detect plurality of clocks 114 to determine the location of each clock of plurality of clocks 114 via a Find Me Profile (FMP) service or a Proximity Profile (PXP) service. Communication module 208 and the applicable communication module of the respective clock enter a locator/target relationship in which communication module 208 generates requests configured to alert the applicable communication module of the respective clock via a visual or auditory signal and applicable communication module of the respective clock reports back the estimated position of the respective clock. In some embodiments, one or more beacons may be utilized to provide positioning services. In some embodiments, communication module 208 is configured to broadcast relative signal strengths in order to determine the position of the clocks. In some embodiments, communication module 208 may perform ranging, angulation, lateration, fingerprinting, or any other identification mechanisms known to those of ordinary skill in the art. In some embodiments, processor 202 provides one or more instructions to communication module 208 to detect each clock in the environment based on a predefined proximity threshold; wherein based on a clock being detected outside of the predefined proximity threshold via communication module 208, processor 202 automatically groups all detected clocks within the predefined proximity threshold in a specified grouping and excludes the one or more clocks outside of the predefined proximity threshold allowing processor 202 to generate the clock tracking profile for each clock in the grouping and automatically apply an adjustment to time component of each clock tracking profile in order to ensure plurality of clocks 114 are synchronized.

In some embodiments, user 108 may manually adjust the time component of each clock tracking profile of clock group 114 by accessing the mobile application on computing device 110. The mobile application also supports functions such as customized naming of clocks of clock group 114 allowing user 108 to designate each clock of clock group 114, wherein the settings of TCA device 112 and clock group 114 are stored on memory 206. In some embodiments, communication module 208 may include an active timekeeping module configured to continuously search for inaccuracies associated with time components of the clock tracking profiles based on the current time provided by server 102 in order to ensure that time components of the clock tracking profiles are synchronized. It is to be understood that the purpose of communication module 208 is to establish one or more connections with clocks within the environment allowing TCA device 112 to automatically adjust the time component of each clock tracking profile or the time component of the clock tracking profiles may be adjusted manually via user 108 accessing the mobile application.

Figure 3:
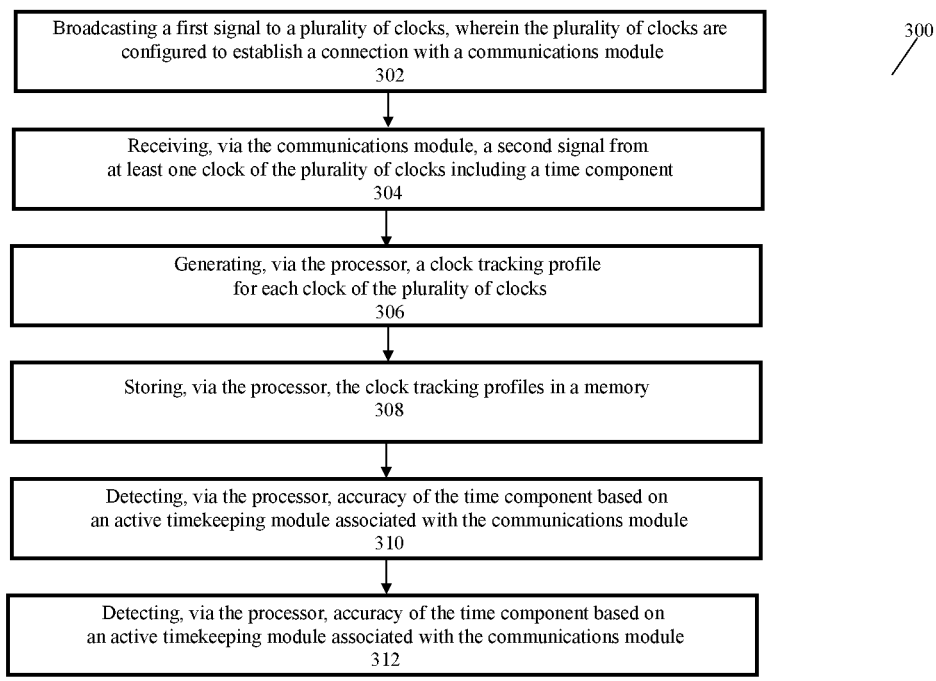
FIG. 3 is a flow diagram illustrating an exemplary method for time component adjustment, according to an example embodiment.

Referring now to FIG. 3, a method for adjusting a time component 300 is depicted, according to an exemplary embodiment. At step 302, TCA device 112 broadcasts, via communication module 208, one or more signals into the environment with the intention of establishing a connection between clocks within the environment and communication module 208. It is to be understood that the type of signals generated by communication module 208 may be any applicable signal configured to detect devices including but not limited to radio communications, optical wireless communications, or any other applicable signal transmissions. In a preferred embodiment, user 108 does not have to physically interact with plurality of clocks 114 unless user 108 needs to replace and/or replenish the power source associated with the respective clock. At step 304, communication module 208 receives one or more signals from at least one clock of plurality of clocks 114 allowing the one or more connections to be established between plurality of clocks 114. In some embodiments, TCA device 112 is configured to scan start triggers and one or more established connections between communication module 208 and plurality of clocks 114 allowing TCA device 112 to determine if a synchronization signal needs to be applied in order for the time component to be updated. At step 306, processor 202 and/or server 102 generates the clock tracking profile for each clock of plurality of clocks 114 allowing information of each clock to be embodied in a data record configured to be edited by server 102 and/or user 108. At step 308, the generated clock tracking profiles are stored in at least one of database 104 and/or memory 206. It is to be understood that once a clock tracking profile has been generated for a clock the clock is assigned an identifier by server 102 and server 102 provides a graphical user interface associated with the mobile application to user 108 allowing user 108 to manually group/cluster and manually request to adjust the respective clock within clock group 114; however, server 102 is configured to automatically group clocks based on communication module 208 detecting the clock within the predefined proximity threshold. In some embodiments, each clock tracking profile generated is depicted on the graphical user interface as an icon configured to be interacted with by user 108 in which dragging and positioning of one icon on top of another forms a grouping which may be named by user 108. The clock tracking profile includes the identifier, the assigned or user determined group name, a history of interactions/transaction associated with the respective clock, and any other applicable data associated with the clock (battery life, etc.). At step 310, server 102 and/or processor 202 analyzes the clock tracking profiles of clock group 114 to ensure that the time component of each clock tracking profile corresponds to the current time determined by at least one of server 102, user 108, or processor 202. It is to be understood that the active timekeeping module is tasked with continuously monitoring the clock tracking profiles in order for server 102 and/or processor 202 to determine if there is an inaccuracy or inconsistency associated with the time components. In some embodiments, the active timekeeping module includes a machine learning module designed and configured to utilize a machine learning model (classification model) or rule-based model via training data derived from the clock tracking profiles in order to generate predictions associated with adjustments for the time components. At step 312, server 102 and/or processor 202 updates hour, minute, date, and year based on a detected inaccuracy or inconsistency associated with the time component. Server 102 and/or processor 202 is further configured to adjust the time components in order for the synchronization to account for day-light saving time and leap second. It is to be understood that the purpose of the adjustment is to ensure that synchronization of the time components is performed simultaneously resulting in the correct time being displayed on each clock within clock group 114.

Figure 4:
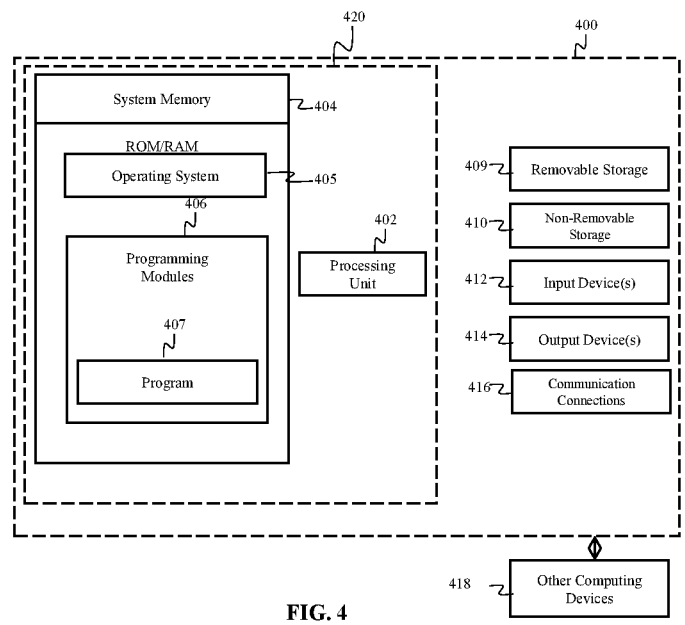
FIG. 4 illustrates a computer system according to exemplary embodiments of the present technology.

FIG. 4 is a block diagram of a system including an example computing device 400 and other computing devices. Consistent with the embodiments described herein, the aforementioned actions performed by server 102 and processor 202 may be implemented in a computing device (preferably a microprocessor), such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process/method 300. Process 300, and data related to said process may operate in other environments and are not limited to computing device 400.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RANI)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In some embodiments, programming modules 406 may include, for example, a program module 407 for executing the actions of server 102 and processor 202, for example. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments of the present invention may include electronic mail and contacts applications, sensor data processing applications, word processing applications, spreadsheet applications, database applications, slide presentation applications, drawing or computer-aided application programs, etc.

What is claimed is:

1. A time component adjusting device comprising:
a memory;
a wireless communication module communicatively coupled to the memory; and
a processor communicatively coupled to a server, the memory, and the wireless communication module, wherein the processor is operable to:
detect clocks within an environment and determine a plurality of clocks within a predetermined proximity threshold from among the clocks in the environment;
cause the wireless communication module to broadcast a first signal that includes clock timing information to the plurality of clocks within the predefined proximity threshold;
receive a second signal from each one of the plurality of clocks within the predetermined proximity threshold, the second signal sent in response to each of the plurality of clocks receiving the first signal, each one of the plurality of clocks including a respective time component for the clock;
transmit an instruction to the server that causes the server to create a clock tracking profile for each one of the plurality of clocks, each one of the plurality of clock tracking profiles for a respective one of the plurality of clocks;

receive, from the server, the plurality of clock tracking profiles;
store the plurality of clock tracking profiles in the memory;
detect a time inaccuracy of the time component for each one of the plurality of clocks based on an active timekeeping module; and
update a time of each of the plurality of clocks based on detection of the time inaccuracy of the time component by transmitting a correct time to each of the plurality of clocks.

2. The time component adjusting device of claim 1, further comprising:
a housing with an interior space that is shaped and sized to retain the memory, communication module, and the processor.

3. The time component adjusting device of claim 1, wherein the communication module is communicatively coupled to a network.

4. The time component adjusting device of claim 3, wherein the communication module is configured to be communicatively coupled to at least one computing device via the network.

5. The time component adjusting device of claim 1, wherein the communication module comprises at least one of a Bluetooth low energy module and a WIFI module.

6. The time component adjusting device of claim 1, wherein the processor is further configured to:
automatically apply a daylight savings adjustment to the time component based on detection of the inaccuracy of the time component.

7. The time component adjusting device of claim 1, wherein the processor is further configured to:
automatically apply a leap second adjustment to the time component based on detection of the inaccuracy of the time component.

8. The time component adjusting device of claim 1, wherein the processor is further configured to:
detect the plurality of clocks by determining that each clock of the plurality of clocks is within a predefined proximity threshold of the communication module via at least one signal generated by the communication module;
group the plurality of clocks based on the determination; and
update the clock tracking profile of each clock of the plurality of clocks.

9. The time component adjusting device of claim 1, wherein the active timekeeping module comprises a machine learning component designed and configured to utilize one or more machine learning techniques to train a classification model and generate an output associated with updating the clock tracking profile based on the classification model.

10. The time component adjusting device of claim 1, wherein the active timekeeping module comprises a machine learning component designed and configured to utilize one or more machine learning techniques to train a classification model and generate an output associated with updating the clock tracking profile based on the classification model.

11. A system for adjusting a time component comprising:
a server;
a time component adjusting device having:
a housing;
a memory;
a wireless communication module communicatively coupled to the memory; and
a processor communicatively coupled to the memory, the server, and the wireless communication module, wherein the processor is operable to:
detect clocks within an environment and determine a plurality of clocks within a predetermined proximity threshold from among the clocks in the environment;
cause the wireless communication module to broadcast a first signal that includes clock timing information to the plurality of clocks;
receive a second signal from each one of the plurality of clocks, the second signal sent by each one of the plurality of clocks in response to receiving the first signal, the second signal sent by each one of the plurality of clocks including a respective time component for the clock;
transmit an instruction to the server that causes the server to create a clock tracking profile for each one of the plurality of clocks, each one of the plurality of clock tracking profiles for a respective one of the plurality of clocks;
receive, from the server, the plurality of clock tracking profiles;
store the plurality of clock tracking profiles in the memory;
determine a time accuracy or inaccuracy of the time component for each one of the plurality of clocks based on an active timekeeping module; and
update each one of the plurality of clock tracking profiles upon detection of a time inaccuracy of the time component.

12. The system of claim 11, further comprising:
an interface operable to:
receive a request to group the plurality of clocks;
access the clock tracking profile of each clock of the group; and
receive a request to adjust the time component of the clock tracking profile.

13. The system of claim 11, wherein the communication module is communicatively coupled to a network.

14. The system of claim 13, wherein the communication module is configured to be communicatively coupled to at least one computing device via the network.

15. The system of claim 11, wherein the communication module comprises a Bluetooth low energy module and a WIFI module.

16. The system of claim 11, wherein the processor is further configured to:
automatically apply a daylight savings adjustment to the time component based on detection of the inaccuracy of the time component.

17. The system of claim 11, wherein the processor is further configured to:
automatically apply a leap second adjustment to the time component based on detection of the inaccuracy of the time component.

18. The system of claim 11, wherein the processor is further configured to:
detect the plurality of clocks by determining each clock of the plurality of clocks is within a predefined proximity threshold of the communication module via at least one signal generated by the communication module.

19. A method of time component adjusting for a plurality of clocks, comprising:
   detecting clocks within an environment and determine a plurality of clocks within a predetermined proximity threshold from among the clocks in the environment
   broadcasting, via a time component adjusting device including a processor, a first signal to the plurality of clocks, wherein the plurality of clocks are configured to establish a connection with a communication module of the time component adjusting device;
   receiving, via the communication module, a second signal from at least one clock of the plurality of clocks including a time component;
   transmitting, from the time component adjusting device to a server, an instruction to the server that causes the server to create a clock tracking profile for each one of the plurality of clocks, each one of the plurality of clock tracking profiles for a respective one of the plurality of clocks;
   the server generating, responsive to the instruction, a plurality of clock tracking profiles, each one of the plurality of clock tracking profiles for a respective one of the plurality of clocks;
   the server transmitting the plurality of clock tracking profiles to the time component adjusting device;
   storing, via the processor, the plurality of clock tracking profiles in a memory;
   detecting, via the processor, a time accuracy of the time component of each one of the plurality of clocks based on an active timekeeping module associated; and
   updating, via the processor, the clock tracking profiles based on detection of a time inaccuracy of the time component of each one of the plurality of clocks.

20. The method of claim 19, further comprising:
   utilizing, via the active timekeeping module, one or more machine learning techniques to train a classification model and generate an output associated with updating the clock tracking profile based on the classification model.

* * * * *